United States Patent
Lee

(10) Patent No.: US 11,362,559 B2
(45) Date of Patent: Jun. 14, 2022

(54) MOTOR

(71) Applicant: LG INNOTEK CO., LTD., Seoul (KR)

(72) Inventor: Seong Jin Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 127 days.

(21) Appl. No.: 16/645,323

(22) PCT Filed: Aug. 27, 2018

(86) PCT No.: PCT/KR2018/009844
§ 371 (c)(1),
(2) Date: Mar. 6, 2020

(87) PCT Pub. No.: WO2019/050199
PCT Pub. Date: Mar. 14, 2019

(65) Prior Publication Data
US 2020/0381974 A1     Dec. 3, 2020

(30) Foreign Application Priority Data
Sep. 6, 2017 (KR) .................. 10-2017-0113927

(51) Int. Cl.
*H02K 3/52* (2006.01)
(52) U.S. Cl.
CPC ......... *H02K 3/522* (2013.01); *H02K 2203/09* (2013.01)
(58) Field of Classification Search
CPC ................ H02K 2203/09; H02K 3/522
See application file for complete search history.

(56) References Cited

U.S. PATENT DOCUMENTS

| | | | | |
|---|---|---|---|---|
| 7,808,137 B2* | 10/2010 | Neet | .................. | H02K 3/50 |
| | | | | 310/71 |
| 8,734,133 B2* | 5/2014 | Tanahashi | ........... | F04D 13/0693 |
| | | | | 417/417 |
| 9,768,655 B2* | 9/2017 | Neet | .................. | H02K 3/505 |

(Continued)

FOREIGN PATENT DOCUMENTS

| CN | 101257237 A | 9/2008 |
|---|---|---|
| CN | 106716791 A | 5/2017 |

(Continued)

OTHER PUBLICATIONS

Supplementary European Search Report dated Sep. 28, 2020 in European Application No. 18853828.4.

(Continued)

*Primary Examiner* — Robert W Horn
(74) *Attorney, Agent, or Firm* — Saliwanchik, Lloyd & Eisenschenk

(57) ABSTRACT

The present invention can provide a motor comprising: a stator; a rotor disposed inside the stator; a shaft coupled to the rotor; and a bus bar disposed at the upper side of the stator, wherein: the bus bar includes a terminal connected to a stator coil, and a body for insulating the terminal; the terminal includes a first terminal and a second terminal of which the circuits are separated; the body includes a first body and a second body, and a bridge part for connecting the separated first body and second body; and the first terminal is disposed at the first body and the second terminal is disposed at the second body.

12 Claims, 7 Drawing Sheets

(56) References Cited

U.S. PATENT DOCUMENTS

| | | | | |
|---|---|---|---|---|
| 10,069,366 | B2* | 9/2018 | Neet | H02K 3/505 |
| 10,211,699 | B2* | 2/2019 | Fukunaga | H01R 25/167 |
| 10,666,110 | B2* | 5/2020 | Ito | H01R 9/223 |
| 2008/0084128 | A1 | 4/2008 | Neet et al. | |
| 2008/0211332 | A1 | 9/2008 | Kataoka et al. | |
| 2009/0127948 | A1* | 5/2009 | Shimizu | H02K 3/50 |
| | | | | 310/71 |
| 2012/0126638 | A1* | 5/2012 | Tanaka | H02K 11/046 |
| | | | | 310/43 |
| 2015/0097453 | A1* | 4/2015 | Nishikawa | H02K 3/50 |
| | | | | 310/71 |
| 2015/0295371 | A1 | 10/2015 | Houzumi et al. | |
| 2017/0133905 | A1 | 5/2017 | Nakamura et al. | |
| 2018/0079446 | A1 | 3/2018 | Sun et al. | |
| 2018/0241277 | A1* | 8/2018 | Du | H02K 3/28 |
| 2018/0316238 | A1 | 11/2018 | Kong | |
| 2020/0036255 | A1* | 1/2020 | Shirai | H02K 11/33 |
| 2020/0280236 | A1* | 9/2020 | Natsumeda | H02K 3/522 |
| 2021/0143699 | A1* | 5/2021 | Alsman | H02K 3/28 |

FOREIGN PATENT DOCUMENTS

| | | |
|---|---|---|
| DE | 10 2013 208 570 A1 | 11/2014 |
| JP | 2004-072946 A | 3/2004 |
| JP | 2011-177001 A | 9/2011 |
| JP | 2015-006118 A | 1/2015 |
| JP | 2016-101035 A | 5/2016 |
| KR | 10-2011-0069088 A | 6/2011 |
| WO | WO-2017/078455 A1 | 5/2017 |
| WO | WO-2017/138534 A1 | 8/2017 |

OTHER PUBLICATIONS

International Search Report dated Nov. 20, 2018 in International Application No. PCT/KR2018/009844.
Office Action dated Jul. 1, 2021 in Chinese Application No. 201880057724.6.
Office Action dated Apr. 1, 2022 in Korean Application No. 10-2017-0113927. I could see it, but could not read it.
Office Action dated Feb. 18, 2022 in Chinese Application No. 201880057724.6. I could see it, but could not read it.

* cited by examiner

MOTOR

CROSS-REFERENCE TO RELATED APPLICATIONS

This application is the U.S. national stage application of International Patent Application No. PCT/KR2018/009844, filed Aug. 27, 2018, which claims the benefit under 35 U.S.C. § 119 of Korean Patent Application No. 10-2017-0113927, filed Sep. 6, 2017, the disclosures of each of which are incorporated herein by reference in their entirety.

TECHNICAL FIELD

An embodiment relates to a motor.

BACKGROUND ART

An electronic power steering (EPS) apparatus is an apparatus configured to allow a driver to safely drive by ensuring the turning stability of a vehicle and providing a quick restoring force of the vehicle. The EPS apparatus controls the driving of a steering shaft of the vehicle by driving a motor through an electronic control unit (ECU) according to operating conditions sensed by a vehicle speed sensor, a torque angle sensor, a torque sensor, and the like.

The motor includes a rotor and a stator. A coil is wound around the stator. A connection end of the coil wound around the stator can be connected to a bus bar. The bus bar includes a body and a terminal. The terminal is connected to the connection end of the coil. Further, the terminal can be connected to an external power source through a cable.

The terminal can be formed of a combination of a phase terminal to which U phase, V-phase, and W-phase power sources are connected, and a neutral terminal which connects the phase terminal. In this case, in order to secure the safety of the motor, two terminals of the above-described combination can be disposed, and the circuits of the two terminals can be separated. When a fault occurs in a circuit connected to one terminal or an element connected to the circuit, the driving of the motor can be secured through the other terminal. The two terminals are spatially separated in the body of the bus bar.

However, in a process of injection-molding the bus bar, when an error occurs in positions of the two terminals, a problem that the two terminals are connected without their circuits being separated can occur. Specifically, since the connection ends of the terminals are arranged at an equal interval, when the molding of the bus bar is completed, whether the neutral terminal or the phase terminal is correctly positioned is difficult to visually check. Accordingly, a serious risk that the motor can be manufactured without finding the problem in a process of connecting the terminals of the bus bar to the coil of the stator is present.

DISCLOSURE

Technical Problem

Accordingly, an embodiment is directed to providing a motor capable of securing accurate positions of terminals in a process of molding a bus bar.

Problems desired to be solved by the present invention are not limited to the above-described problems, and purposes and effects understood from solutions and embodiments which will be described below are also included.

Technical Solution

One aspect of the present invention provides a motor including a stator, a rotor disposed in the stator, a shaft coupled to the rotor, and a bus bar disposed on the stator, wherein the bus bar includes terminals connected to a coil of the stator, and a body configured to insulate the terminals, the terminals include a first terminal and a second terminal whose circuits are separated, the body includes a first body, a second body, and bridge portions configured to connect the first body and the second body which are separated, the first terminal is disposed on the first body, and the second terminal is disposed on the second body.

Preferably, a width of at least one of the bridge portions may be smaller than a width of the first body or a width of the second body.

Preferably, with respect to a radial direction of the bus bar, a length from a center of the bus bar to an outer side surface of the bridge portion may be the same as a distance from the center of the bus bar to an outer circumferential surface of the first body and a length from the center of the bus bar to an outer circumferential surface of the second body, and, with respect to the radial direction of the bus bar, a length from the center of the bus bar to an inner side surface of the bridge portion may be smaller than the distance from the center of the bus bar to the outer circumferential surface of the first body and a length from the center of the bus bar to the second body.

Preferably, with respect to a radial direction of the bus bar, a length from a center of the bus bar to an inner side surface of the bridge portion may be the same as a distance from the center of the bus bar to an inner circumferential surface of the first body and a length from the center of the bus bar to an inner circumferential surface of the second body, and, with respect to the radial direction of the bus bar, a length from the center of the bus bar to an outer side surface of the bridge portion may be smaller than the distance from the center of the bus bar to an outer circumferential surface of the first body and a length from the center of the bus bar to an outer circumferential surface of the second body.

Preferably, the first terminal may include a first phase terminal and a first neutral terminal, and a connection end of the first neutral terminal between a connection end of the first phase terminal and the connection end of the first neutral terminal with respect to a circumferential direction of the bus bar, may be disposed most adjacent to the bridge portion.

Preferably, the second terminal may include a second phase terminal and a second neutral terminal, and a connection end of the second neutral terminal between a connection end of the second phase terminal and the connection end of the second neutral terminal with respect to the circumferential direction of the bus bar, may be disposed most adjacent to the bridge portion.

Preferably, with respect to an arbitrary line which connects the bridge portions at a center of the bus bar, the first terminal may be disposed on one side with respect to the arbitrary line, and the second terminal may be disposed on the other side with respect to the arbitrary line.

Preferably, with respect to a radial direction of the bus bar, a length from a center of the bus bar to an outer side surface of the bridge portion may be smaller than a distance from the center of the bus bar to an outer circumferential surface of the first body and a length from the center of the bus bar to an outer circumferential surface of the second body, and, with respect to the radial direction of the bus bar, a length from the center of the bus bar to an inner side surface of the bridge portion may be greater than a distance from the center of the bus bar to an inner circumferential surface of the first body and a length from the center of the bus bar to an inner circumferential surface of the second body.

Another aspect of the present invention provides a motor including a stator, a rotor disposed in the stator, a shaft coupled to the rotor, and a bus bar disposed on the stator, wherein the bus bar includes terminals connected to a coil of the stator, and a body configured to insulate the terminals, the terminals include a first terminal and a second terminal whose circuits are separated, the body includes a first body, a second body, and bridge portions configured to connect one end portion of the first body and one end portion of the second body which are separated, the first terminal is disposed on the first body, the second terminal is disposed on the second body, and the other end of the first body and the other end of the second body are disposed to be spaced apart from each other.

Advantageous Effects

According to an embodiment, an advantageous effect that accurate positions of terminals can be secured in a bus bar including two terminals whose circuits are separated is provided.

MODES OF THE INVENTION

Hereinafter, an embodiment of the present invention will be described in detail with reference to the accompanying drawings. Purposes, particular advantages, and new characteristic of the present invention may become more apparent from the following detailed description related to the accompanying drawings and the embodiment. In addition, while describing the present invention, a detailed description for a related technology which may unnecessarily obscure the spirit of the present invention will be omitted.

Further, it should be understood that, although the terms "second," "first," and the like may be used herein to describe various elements, the elements are not limited by the terms. The terms are only used to distinguish one element from another. For example, a first element could be termed a second element, and similarly, a second element could be termed a first element without departing from the scope of the present invention. The term "and/or" includes combinations of one or all of a plurality of associated listed items.

Figure 1:
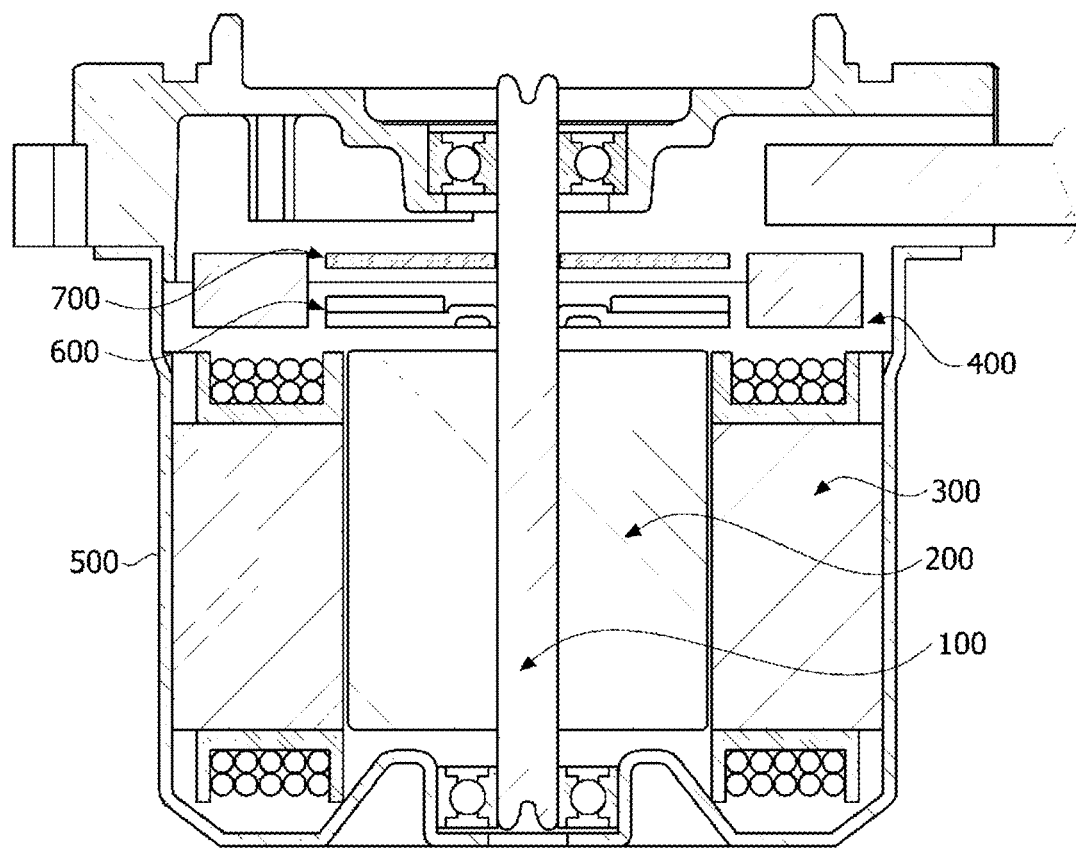
FIG. 1 is a side cross-sectional view of a motor according to an embodiment.

FIG. 1 is a side cross-sectional view of a motor according to an embodiment.

Figure 2:
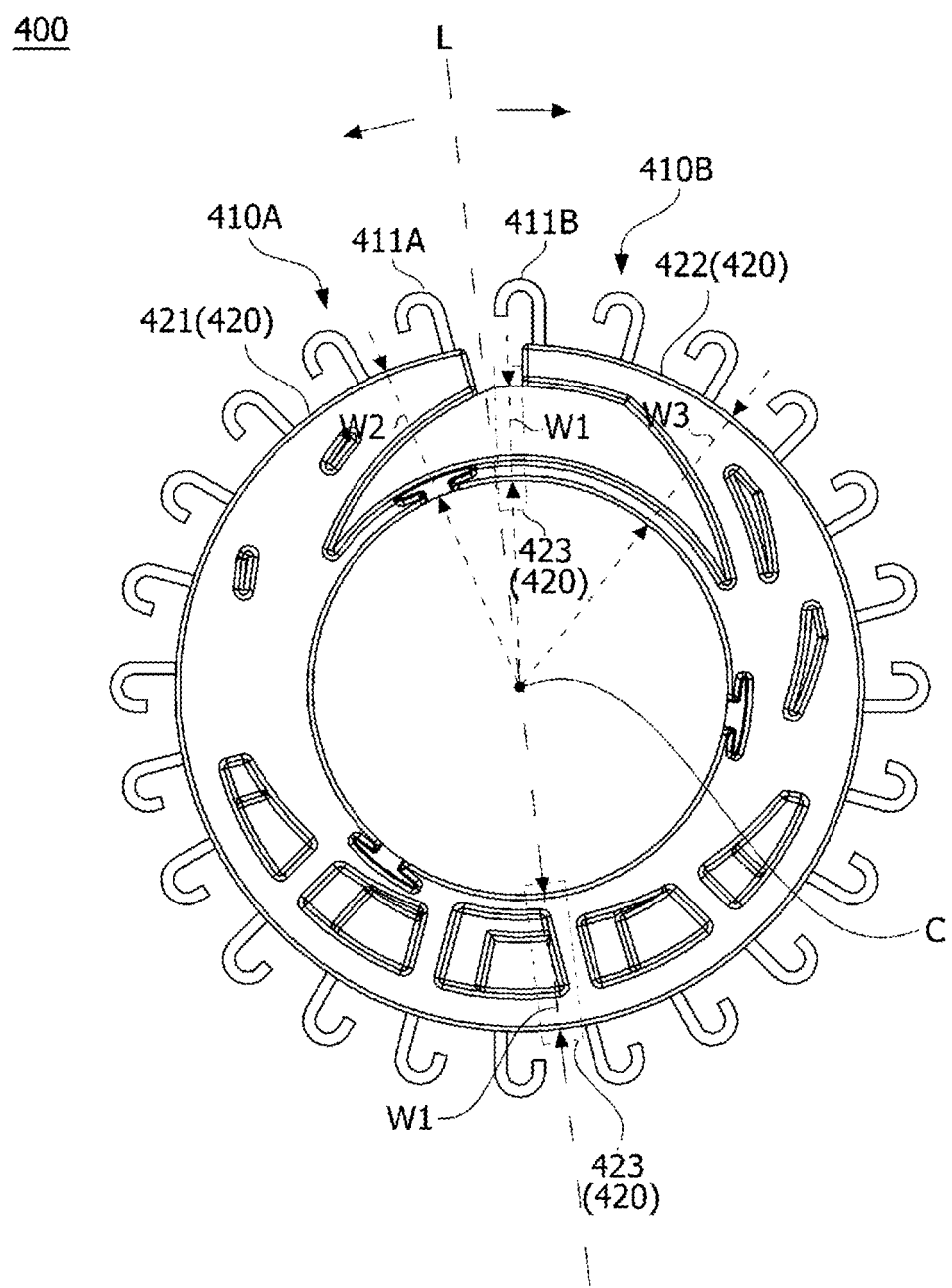
FIG. 2 is a view illustrating a bus bar of the motor according to the embodiment.

Referring to FIGS. 1 and 2, a motor 10 according to the embodiment may include a shaft 100, a rotor 200, a stator 300, and a bus bar 400.

The shaft 100 may be coupled to the rotor 200. When an electromagnetic interaction between the rotor 200 and the stator 300 occurs through current supply, the rotor 200 rotates and thus the shaft 1 rotates. The shaft 100 may be connected to a steering shaft of a vehicle to transmit power to the steering shaft.

The rotor 200 rotates through the electromagnetic interaction with the stator 300.

The rotor 200 may include a rotor core and magnets. The rotor core may be implemented in a shape in which a plurality of plates having the form of a circular thin steel plate are stacked or in the form of one cylinder. A hole to which the shaft 100 is coupled may be disposed in a center of the rotor core. A protrusion which guides the magnets may protrude from an outer circumferential surface of the rotor core. The magnets may be attached to the outer circumferential surface of the rotor core. A plurality of magnets may be disposed along a circumference of the rotor core at predetermined intervals. Further, the rotor 200 may include a can member which surrounds the magnets to fix the magnets so that the magnets are not separated from the rotor core and to prevent inhibit the magnets from being exposed.

A coil 310 may be wound around the stator 300 to cause the electromagnetic interaction between the rotor 200 and the stator 300. A specific configuration of the stator 300 for winding the coil 310 is as follows. The stator 300 may include a stator core including a plurality of teeth. The stator core may be provided with an annular yoke portion, and teeth on which the coil is wound may be provided on the yoke in a center direction. The teeth may be provided along an outer circumferential surface of the yoke portion at predetermined intervals. Meanwhile, the stator core may be formed by stacking a plurality of plates having the form of a thin steel plate on each other. Further, a plurality of divided cores may be coupled or connected to each other to form the stator core.

The bus bar 400 may be disposed on the stator 300. The bus bar 400 may include terminals in an annular body. Further, the terminals of the bus bar 400 may include a phase terminal connected to a U phase power source, a V phase power source, and a W phase power source and a neutral terminal which electrically connects the phase terminal.

A housing 500 may accommodate the rotor 200 and the stator 300 therein.

A sensing magnet 600 is a device coupled to the shaft 100 to be linked with the rotor 200 to detect a position of the rotor 200.

A sensor which senses a magnetic force of the sensing magnet 600 may be disposed on a printed circuit board 700. In this case, the sensor may be a Hall IC. The sensor generates sensing signals by sensing a change of the N-pole and the S-pole of the sensing magnet 600.

Figure 3:
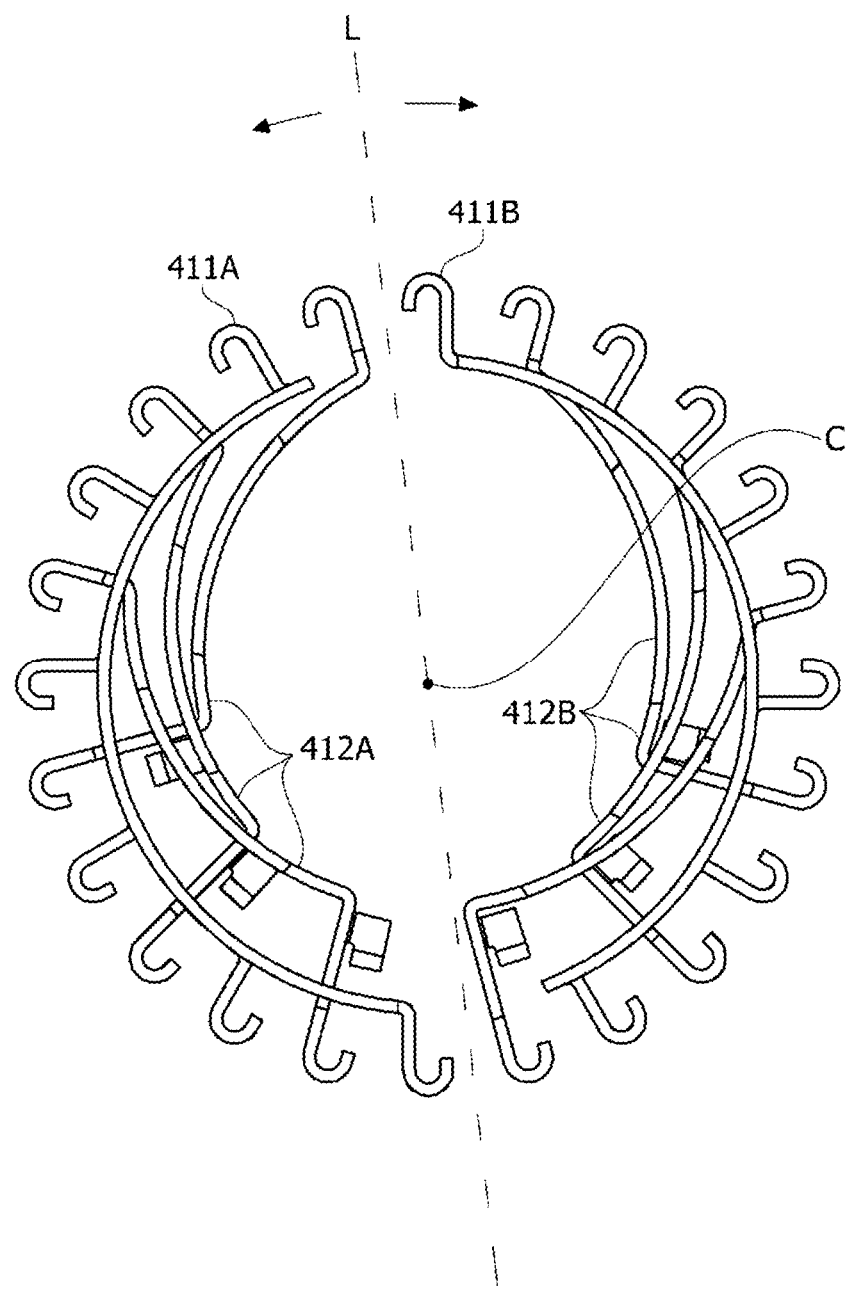
FIG. 3 is a view illustrating terminals of the bus bar shown in FIG. 2.
Figure 4:
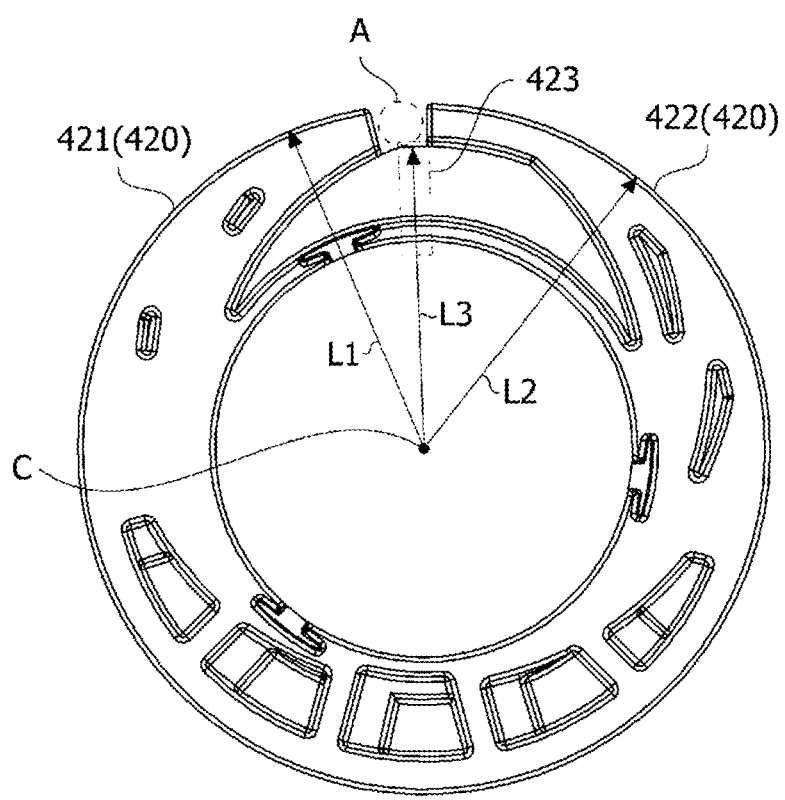
FIG. 4 is a view illustrating a body of the bus bar shown in FIG. 2.

FIG. 2 is a view illustrating a bus bar of the motor according to the embodiment. FIG. 3 is a view illustrating terminals of the bus bar shown in FIG. 2. FIG. 4 is a view illustrating a body of the bus bar shown in FIG. 2.

Referring to FIGS. 2 to 4, the bus bar 400 includes terminals 410 and a body 420. The body 420 is a molded product formed through injection-molding. The terminals 410 are disposed in the body 420, and connection ends of the terminals 410 are disposed to be exposed from the body 420. The connection ends of the terminals 410 are connected to the coil (310 in FIG. 1) of the stator (300 in FIG. 1).

The terminals 410 may include a first terminal 410A and a second terminal 410B.

The connection ends of the first terminal 410A and the second terminal 410B are connected to the coil (310 in FIG. 1) of the stator (300 in FIG. 1), but circuits thereof are separated. The first terminal 410A may include one first neutral terminal 411A and three first phase terminals 412A. The second terminal 410B may also include one second neutral terminal 411B and three second phase terminals 412B. The first terminal 410A and the second terminal 410B may be disposed to be spatially separated. The first and second neutral terminals 411A and 411B are relatively longer than the first and second phase terminals 412A and 412B. Accordingly, regarding the first and second neutral terminals 411A and 411B, when an error occurs at a mounting position during a process of injection-molding the bus bar 400, a circuit connected to the first terminal 410A and a circuit connected to the second terminal 410B are connected without separation and thus a critical problem in securing the safety of the motor may be caused.

The body 420 may include a first body 421, a second body 422, and a bridge portion 423. The first body 421 and the second body 422 are completely spatially separated. The bridge portion 423 connects the first body 421 and the second body 422 which are separated. The first body 421, the second body 422, and the bridge portion 423 may be classified and described according to shapes and functional characteristics thereof, and may be one means vertically connected to each other.

The first terminal 410A is disposed on the first body 421. The second terminal 410B is disposed on the second body 422. Accordingly, the first terminal 410A and the second terminal 410B are disposed to be completely spatially separated.

The bridge portion 423 is disposed between the first body 421 and the second body 422. In FIG. 2, a reference line L which shows a position of the bridge portion 423 may pass through a center C of the bus bar 400. With respect to the reference line L, the first terminal 410A is disposed on one side, and the second terminal 410B is disposed on the other side. There may be a plurality of bridge portions 423. As shown in FIG. 2, two bridge portions 423 may be disposed. Each bridge portion 423 becomes a boundary which differentiates the position of the first terminal 410A from the position of the second terminal 410B. Further, each bridge portion 423 becomes a boundary which differentiates the first body 421 from the second body 422.

One of the two bridge portions 423 has a width W1 which is smaller than a width W2 of the first body 421 or a width W3 of the second body 422. The other of the two bridge portions 423 may have a width W1 equal to the width W2 of the first body 421 or the width W3 of the second body 422. Here, a width may be a distance from an inner side surface to an outer side surface in a radial direction from the center C of the annular bus bar 400.

Referring to FIG. 4, L3 in FIG. 4 is smaller than L1 in FIG. 4 or L2 in FIG. 4. In this case, L2 in FIG. 4 and L3 in FIG. 4 may be the same. Here, L1 in FIG. 4 is a distance from the center C of the bus bar 400 to an outer circumferential surface of the first body 421, L2 in FIG. 4 is a distance from the center C of the bus bar 400 to an outer circumferential surface of the second body 422, and L3 in FIG. 4 is a minimum length from the center C of the bus bar 400 to an outer side surface of the bridge portion 423 with respect to a radial direction of the bus bar 400.

In FIG. 2, since the relatively upper bridge portion 423 has a width W1 which is smaller than the width W2 of the first body 421 or the width W3 of the second body 422, with respect to the entire shape of the body 420, a groove (A in FIG. 4) concavely formed in an outer circumferential surface of the body 420 toward the center C is formed. The groove A is realized by a protruding structure protruding from an inner wall of an injection mold forming the outer circumferential surface of the body 420 during the process of injection-molding the bus bar 400.

From injection-molding point of view of the bus bar 400, the protruding structure of the injection mold forming the bridge portions 423 may be a reference for the arrangement of the first terminal 410A and the second terminal 410B.

The outermost connection end of the second neutral terminal 411B of the second terminal 410B is disposed directly adjacent to one side of the bridge portion 423. Further, a connection end of the first phase terminal 412A of the first terminal 410A is disposed on the other side of the bridge portion 423. Further, the outermost end of the first neutral terminal 411A of the first terminal 410A is disposed next to the first phase terminal 412A. During the process of injection-molding the bus bar 400, the first neutral terminal 411A of the first terminal 410A and the second neutral terminal 411B of the second terminal 410B are completely spatially separated.

Figure 5:
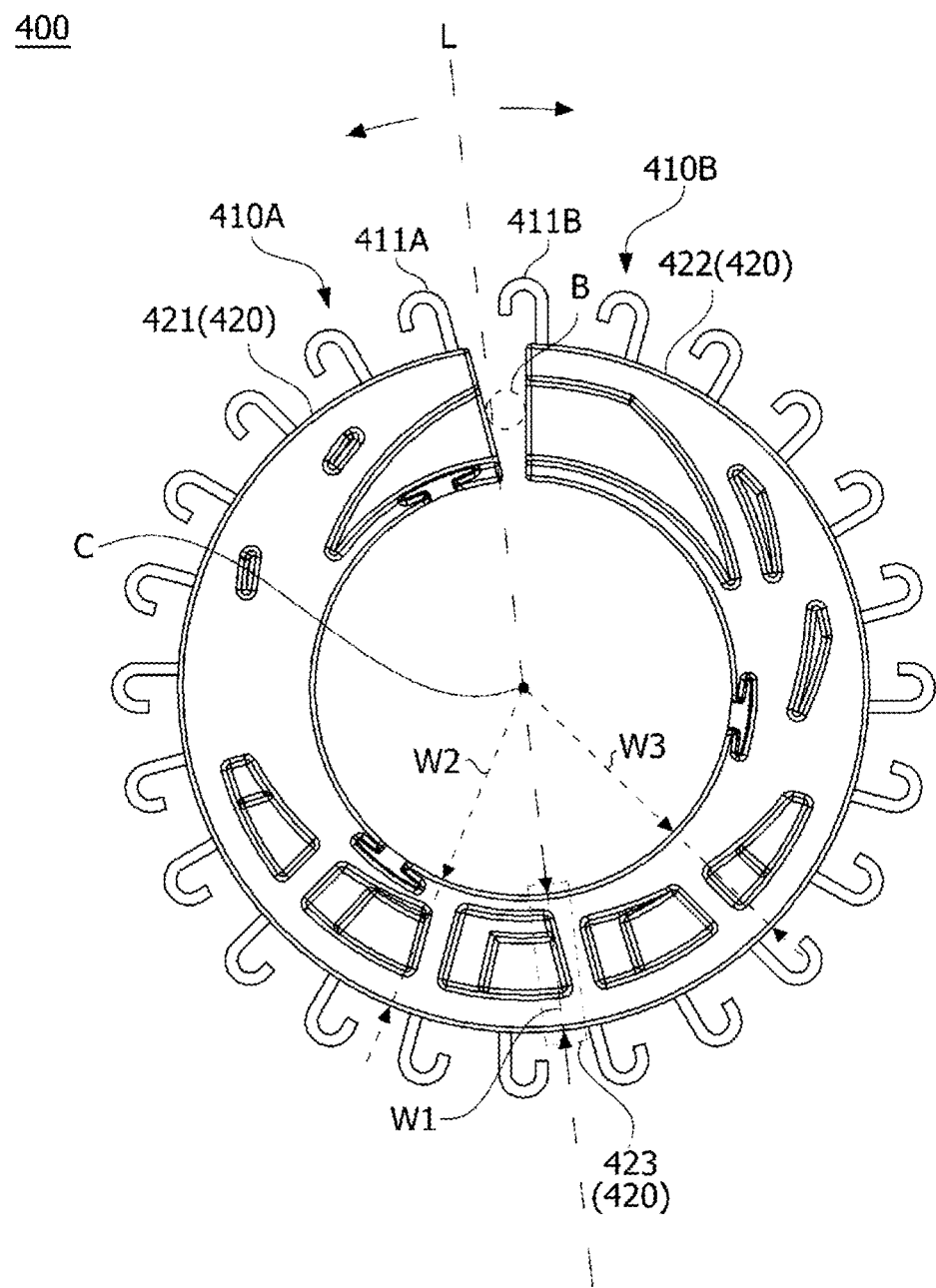
FIG. 5 is a view illustrating a modification of the bus bar of the motor according to the embodiment.

FIG. 5 is a view illustrating a modification of the bus bar of the motor according to the embodiment.

Referring to FIG. 5, in the bus bar 400 according to the modification, the number of bridge portions 423 may be one. Further, the width W1 of the bridge portion 423 may be the same as the width W2 of the first body 421 or the width W3 of the second body 422. In this case, the bridge portion 423 serves to connect the first terminal 410A and the second terminal 410B, but may not be a reference which differentiates the positions of the first terminal 410A and the second terminal 410B. With respect to the center C of the bus bar 400, a separation space B between the first body 421 and the second body 422 may be disposed at a position facing the bridge portion 423. The separation space B may be a reference which differentiates the positions of the first terminal 410A and the second terminal 410B.

From the injection-molding point of view of the bus bar 400, the separation space B is a space where the mold is separated, and the first neutral terminal 411A of the first terminal 410A and the second neutral terminal 411B of the second terminal 410B may be completely spatially separated.

Figure 6:
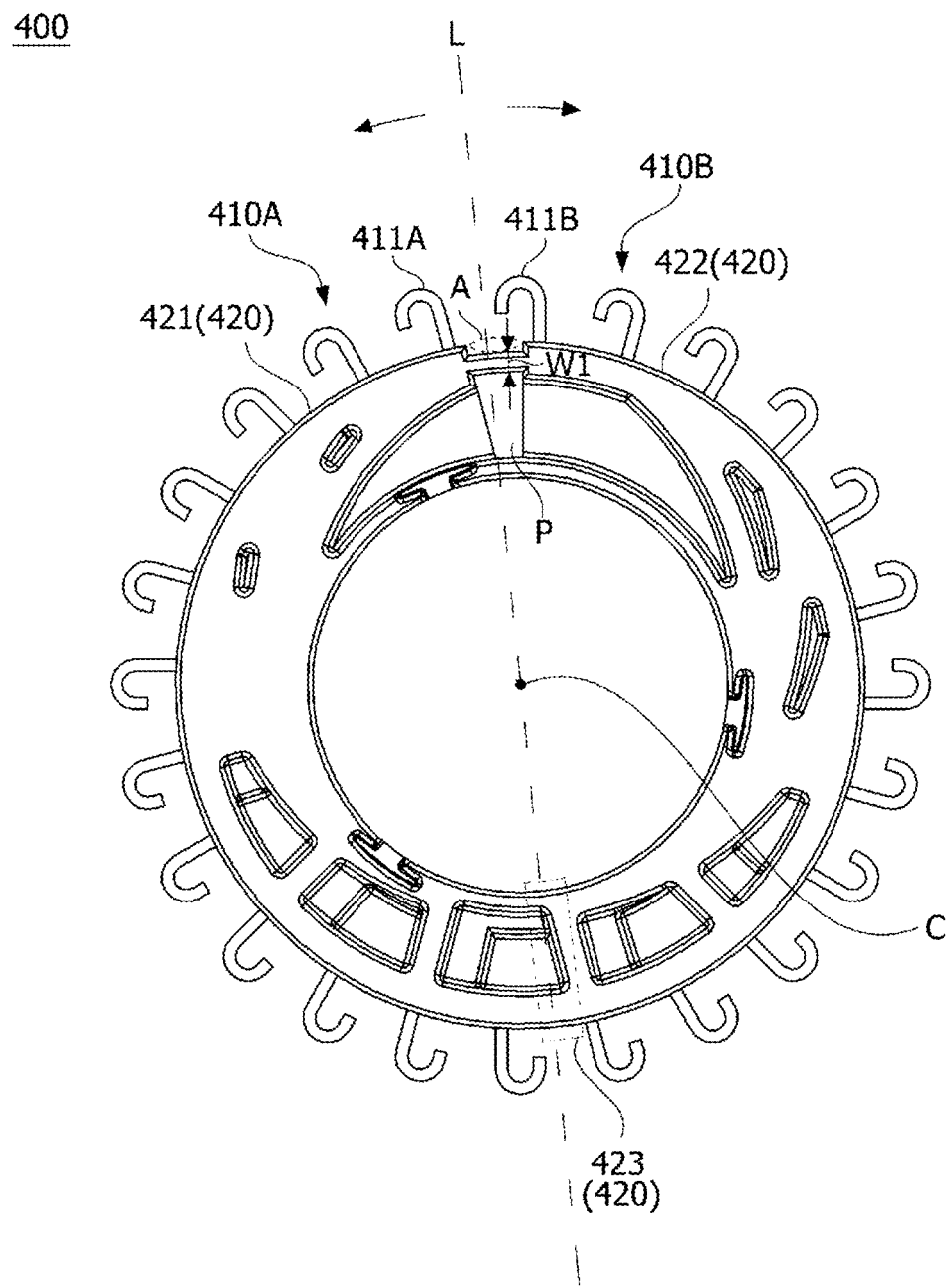
FIG. 6 is a view illustrating another modification of the bus bar of the motor according to the embodiment.
Figure 7:
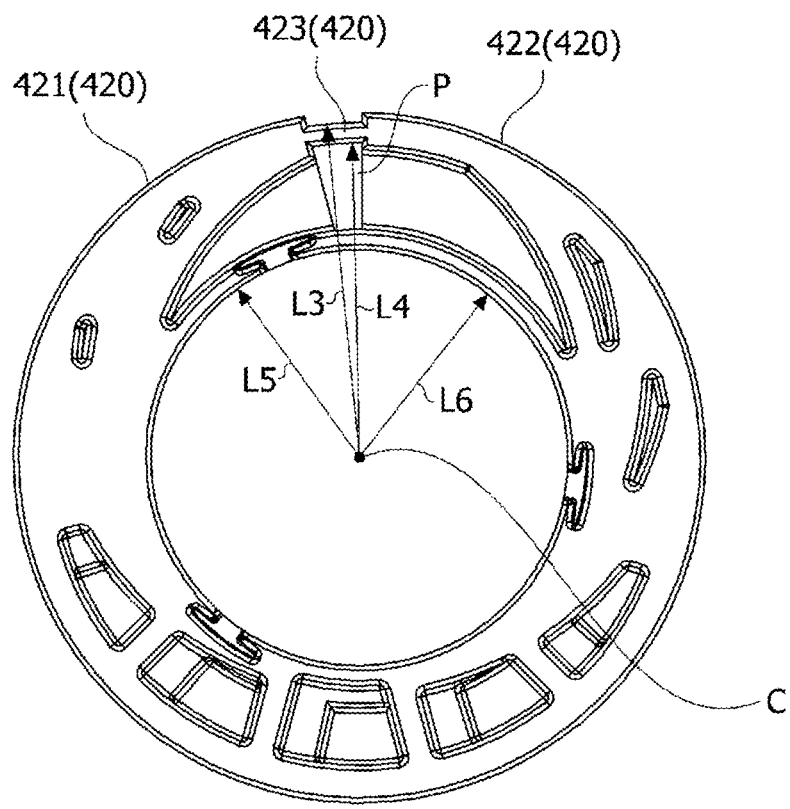
FIG. 7 is a view illustrating a body of the bus bar shown in FIG. 6.

FIG. 6 is a view illustrating another modification of the bus bar of the motor according to the embodiment, and FIG. 7 is a view illustrating a body of the bus bar shown in FIG. 6.

Referring to FIGS. 6 and 7, in the bus bar 400 according to the modification, since the width W1 of the bridge portion 423 is significantly decreased, a hole such as P in FIG. 6 is disposed. L4 in FIG. 7 is greater than L5 in FIG. 7 or L6 in FIG. 7. In this case, L5 in FIG. 7 and L6 in FIG. 7 may be the same. Here, L5 in FIG. 7 is a distance from the center C of the bus bar 400 to an inner circumferential surface of the first body 421, L6 in FIG. 7 is a distance from the center C of the bus bar 400 to an inner circumferential surface of the second body 422, and L4 in FIG. 7 is a minimum length from the center C of the bus bar 400 to an inner side surface of the bridge portion 423 with respect to the radial direction of the bus bar 400.

From the injection-molding point of view of the bus bar 400, the hole P becomes a reference which completely spatially separates the neutral terminal 411A of the first terminal 410A and the neutral terminal 411B of the second terminal 410B through a mold structure, like the groove A.

In the above, the motor according to one embodiment of the present invention has been described in detail with reference to the accompanying drawings.

The embodiment of the present invention should be considered to be exemplary and not limiting, and the scope of the present invention will be shown by the appended claims rather than the above-described detailed description. Further, all possible changes or modifications in forms derived from meanings and the scope of the claims and their equivalents should be considered to be within the scope of the present invention.

The invention claimed is:

1. A motor comprising:
a stator;
a rotor disposed in the stator;
a shaft coupled to the rotor; and
a bus bar disposed on the stator,
wherein the bus bar includes terminals connected to a coil of the stator, and a body configured to insulate the terminals,
wherein the terminals include a first terminal and a second terminal whose circuits are separated,
wherein the body includes a first body, a second body separate from the first body, and bridge portions configured to connect the first body and the second body,
wherein the first terminal is disposed on the first body,
wherein the second terminal is disposed on the second body,
wherein the first terminal includes a first phase terminal and a first neutral terminal, and
wherein the second terminal includes a second phase terminal and a second neutral terminal.

2. The motor of claim 1, wherein a width of at least one of the bridge portions is smaller than a width of the first body or a width of the second body.

3. The motor of claim 1, wherein:
with respect to a radial direction of the bus bar, a length from a center of the bus bar to an outer side surface of the bridge portion is the same as a distance from the center of the bus bar to an outer circumferential surface of the first body and a length from the center of the bus bar to an outer circumferential surface of the second body; and
with respect to the radial direction of the bus bar, a length from the center of the bus bar to an inner side surface of the bridge portion is smaller than the distance from the center of the bus bar to the outer circumferential surface of the first body and a length from the center of the bus bar to the second body.

4. The motor of claim 1, wherein:
with respect to a radial direction of the bus bar, a length from a center of the bus bar to an inner side surface of the bridge portion is the same as a distance from the center of the bus bar to an inner circumferential surface of the first body and a length from the center of the bus bar to an inner circumferential surface of the second body; and
with respect to the radial direction of the bus bar, a length from the center of the bus bar to an outer side surface of the bridge portion is smaller than the distance from the center of the bus bar to an outer circumferential surface of the first body and a length from the center of the bus bar to an outer circumferential surface of the second body.

5. A motor comprising:
a stator;
a rotor disposed in the stator;
a shaft coupled to the rotor; and
a bus bar disposed on the stator,
wherein the bus bar includes terminals connected to a coil of the stator, and a body configured to insulate the terminals,
wherein the terminals include a first terminal and a second terminal whose circuits are separated,
wherein the body includes a first body, a second body separate from the first body, and bridge portions configured to connect the first body and the second body,
wherein the first terminal is disposed on the first body,
wherein the second terminal is disposed on the second body,
wherein the first terminal includes a first phase terminal and a first neutral terminal, and
wherein between a connection end of the first neutral terminal and a connection end of the first phase terminal, the connection end of the first neutral terminal, with respect to a circumferential direction of the bus bar, is disposed most adjacent to the bridge portion.

6. The motor of claim 5, wherein:
the second terminal includes a second phase terminal and a second neutral terminal; and
a connection end of the second neutral terminal between a connection end of the second phase terminal and the connection end of the second neutral terminal with respect to the circumferential direction of the bus bar, is disposed most adjacent to the bridge portion.

7. The motor of claim 6, wherein, with respect to an arbitrary line that connects the bridge portions at a center of the bus bar:
the first terminal is disposed on one side with respect to the arbitrary line; and
the second terminal is disposed on the other side with respect to the arbitrary line.

8. The motor of claim 1, wherein:
with respect to a radial direction of the bus bar, a length from a center of the bus bar to an outer side surface of the bridge portion is smaller than a distance from the center of the bus bar to an outer circumferential surface of the first body and a length from the center of the bus bar to an outer circumferential surface of the second body; and
with respect to the radial direction of the bus bar, a length from the center of the bus bar to an inner side surface of the bridge portion is greater than a distance from the center of the bus bar to an inner circumferential surface of the first body and a length from the center of the bus bar to an inner circumferential surface of the second body.

9. A motor comprising:
a stator;
a rotor disposed in the stator;
a shaft coupled to the rotor; and
a bus bar disposed on the stator,
wherein the bus bar includes terminals connected to a coil of the stator, and a body configured to insulate the terminals,
wherein the terminals include a first terminal and a second terminal whose circuits are separated,
wherein the body includes a first body, a second body separate from the first body, and bridge portions configured to connect one end portion of the first body and one end portion of the second body that are separated, wherein the first terminal is disposed on the first body, wherein the second terminal is disposed on the second body, wherein an other end portion of the first body and an other end portion of the second body are disposed to be spaced apart from each other, wherein the first terminal includes a first phase terminal and a first neutral terminal, and wherein the second terminal includes a second phase terminal and a second neutral terminal.

10. The motor of claim 9, wherein between a connection end of the first neutral terminal and a connection end of the first phase terminal, the connection end of the first neutral terminal, with respect to a circumferential direction of the bus bar, is disposed most adjacent to the bridge portion.

11. The motor of claim 10, wherein between a connection end of the second neutral terminal and a connection end of the second phase terminal, the connection end of the second neutral terminal, with respect to the circumferential direction of the bus bar, is disposed most adjacent to the bridge portion.

12. The motor of claim 11, wherein, with respect to an arbitrary line that connects the bridge portions at a center of the bus bar:

the first terminal is disposed on one side with respect to the arbitrary line; and the second terminal is disposed on the other side with respect to the arbitrary line.

\* \* \* \* \*